(12) United States Patent
Nishio

(10) Patent No.: US 6,429,978 B2
(45) Date of Patent: Aug. 6, 2002

(54) ZOOM LENS AND OPTICAL APPARATUS INCORPORATING THE SAME

(75) Inventor: Akihiro Nishio, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/777,958

(22) Filed: Feb. 7, 2001

(30) Foreign Application Priority Data

Feb. 18, 2000 (JP) ........................................ 2000-041669

(51) Int. Cl.$^7$ ............................................. G02B 15/14
(52) U.S. Cl. ..................... 359/686; 359/682; 359/683; 359/684; 359/716; 359/740; 359/782
(58) Field of Search ................................. 359/686, 681, 359/682, 683, 782, 684, 713, 716, 740

(56) References Cited

U.S. PATENT DOCUMENTS

| | | | |
|---|---|---|---|
| 5,056,900 A | 10/1991 | Mukaiya et al. | 359/676 |
| 5,132,848 A | 7/1992 | Nishio et al. | 359/686 |
| 5,166,828 A | 11/1992 | Ogata | 359/689 |
| 5,216,547 A | 6/1993 | Ogata | 359/689 |
| 5,221,994 A | 6/1993 | Nishio | 359/684 |
| 5,253,113 A | 10/1993 | Sekita et al. | 359/680 |
| 5,523,888 A | 6/1996 | Nishio | 359/686 |
| 5,574,599 A | 11/1996 | Hoshi et al. | 359/689 |
| 5,587,840 A | 12/1996 | Itoh | 359/686 |
| 5,638,216 A | 6/1997 | Horiuchi et al. | 359/683 |
| 5,691,851 A | 11/1997 | Nishio et al. | 359/683 |
| 5,721,643 A | 2/1998 | Hagimori | 359/689 |
| 5,793,535 A | 8/1998 | Ito et al. | 359/689 |
| 5,815,320 A | 9/1998 | Hoshi et al. | 359/686 |
| 5,831,772 A | 11/1998 | Nishio et al. | 359/689 |
| 5,914,819 A * | 6/1999 | Kondo et al. | 359/679 |
| 6,028,716 A | 2/2000 | Kato et al. | 359/689 |
| 6,061,186 A | 5/2000 | Nishio | 359/684 |
| 6,115,188 A | 9/2000 | Nishio et al. | 359/690 |
| 6,141,159 A | 10/2000 | Nishio et al. | 359/793 |

FOREIGN PATENT DOCUMENTS

| | | | |
|---|---|---|---|
| JP | 4-37810 | 2/1992 | |
| JP | 4-76511 | 3/1992 | |
| JP | 4-237009 | 8/1992 | |
| JP | 5-60976 | * 3/1993 | 359/686 |
| JP | 8-262325 | 10/1996 | |
| JP | 9-15499 | 1/1997 | |
| JP | 9-120028 | 5/1997 | |
| JP | 10-31155 | 2/1998 | |

* cited by examiner

Primary Examiner—Evelyn A Lester
(74) Attorney, Agent, or Firm—Fitzpatrick, Cella, Harper & Scinto

(57) ABSTRACT

A zoom lens disclosed herein, having excellent optical performance within a full zoom range, is appropriate for use as a photographing lens for a lens-shutter camera, a video camera, and a digital still camera. The zoom lens includes at least four lens units from the object side, i.e., a first lens unit of negative refractive power, a second lens unit of positive refractive power, a third lens unit of positive refractive power, and a fourth lens unit of negative refractive power. A zooming operation is performed by axially moving the lens units so that the spacing between the first lens unit and the second lens unit becomes wider at the telephoto end than at the wide-angle end, the spacing between the second lens unit and the third lens unit becomes wider at the telephoto end than at the wide-angle end, and the spacing between the third lens unit and the fourth lens unit becomes narrower at the telephoto end than at the wide-angle end. With the focal lengths of respective lens unit set to satisfy a predetermined condition, a compact and high image-quality zoom lens thus results.

10 Claims, 13 Drawing Sheets

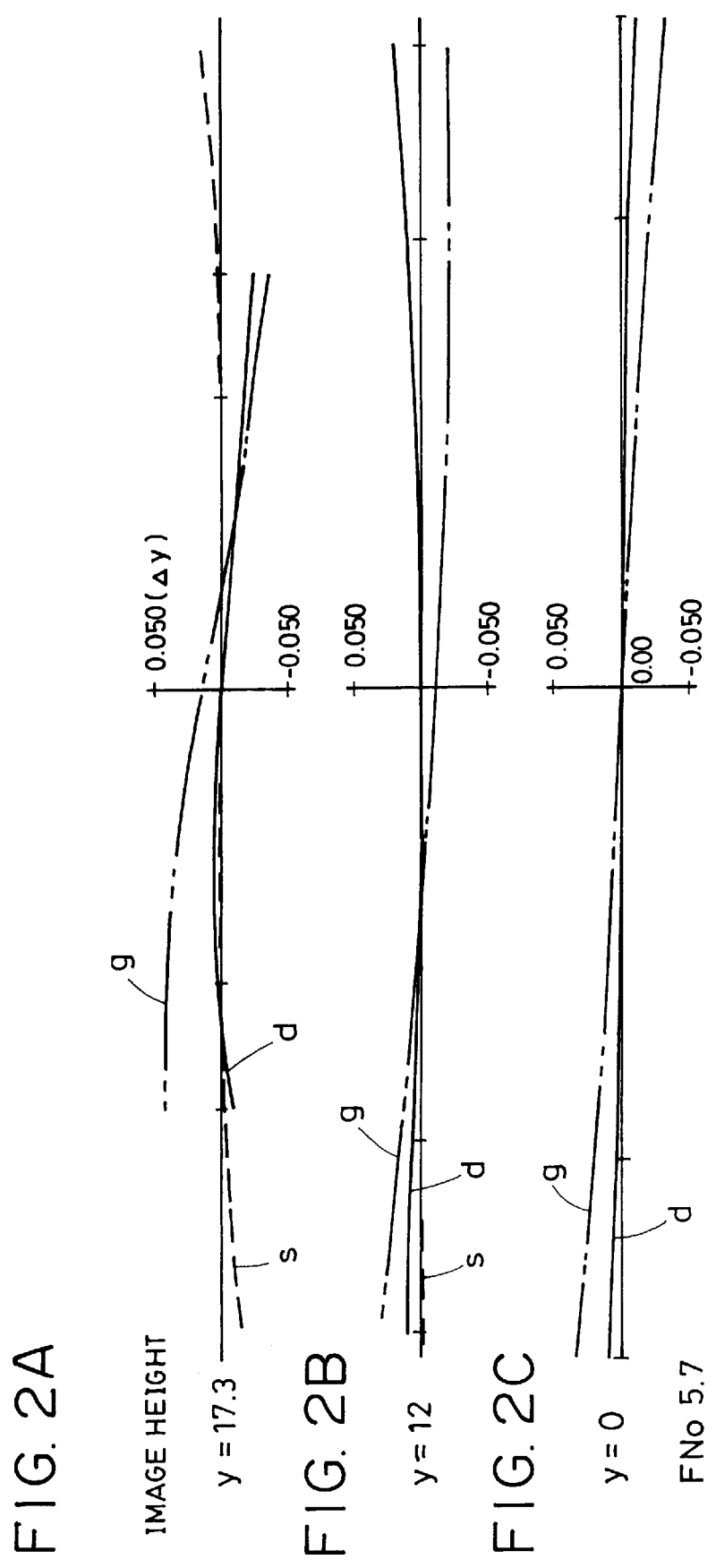

IMAGE HEIGHT
y = 17.3 y = 12 y = 0
FNo 7.5

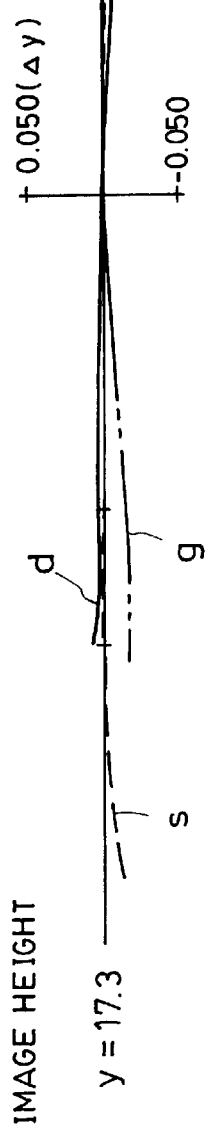
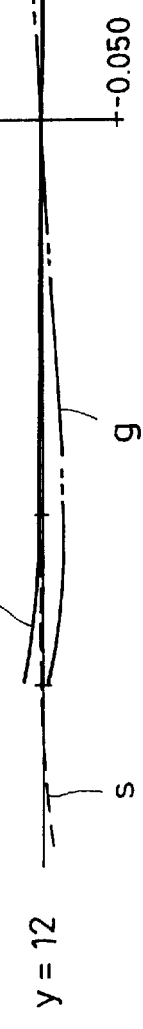
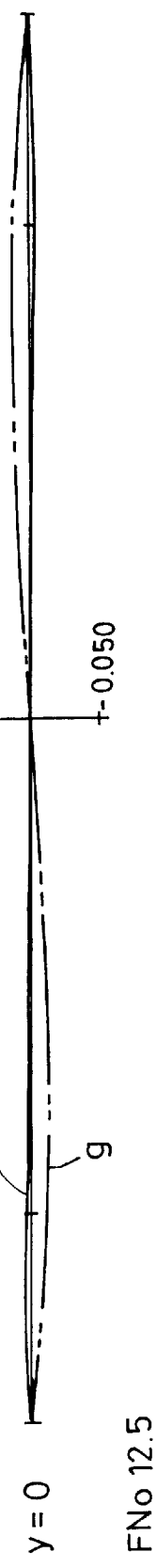
FIG. 4A  y = 17.3  IMAGE HEIGHT
FIG. 4B  y = 12
FIG. 4C  y = 0  FNo 12.5

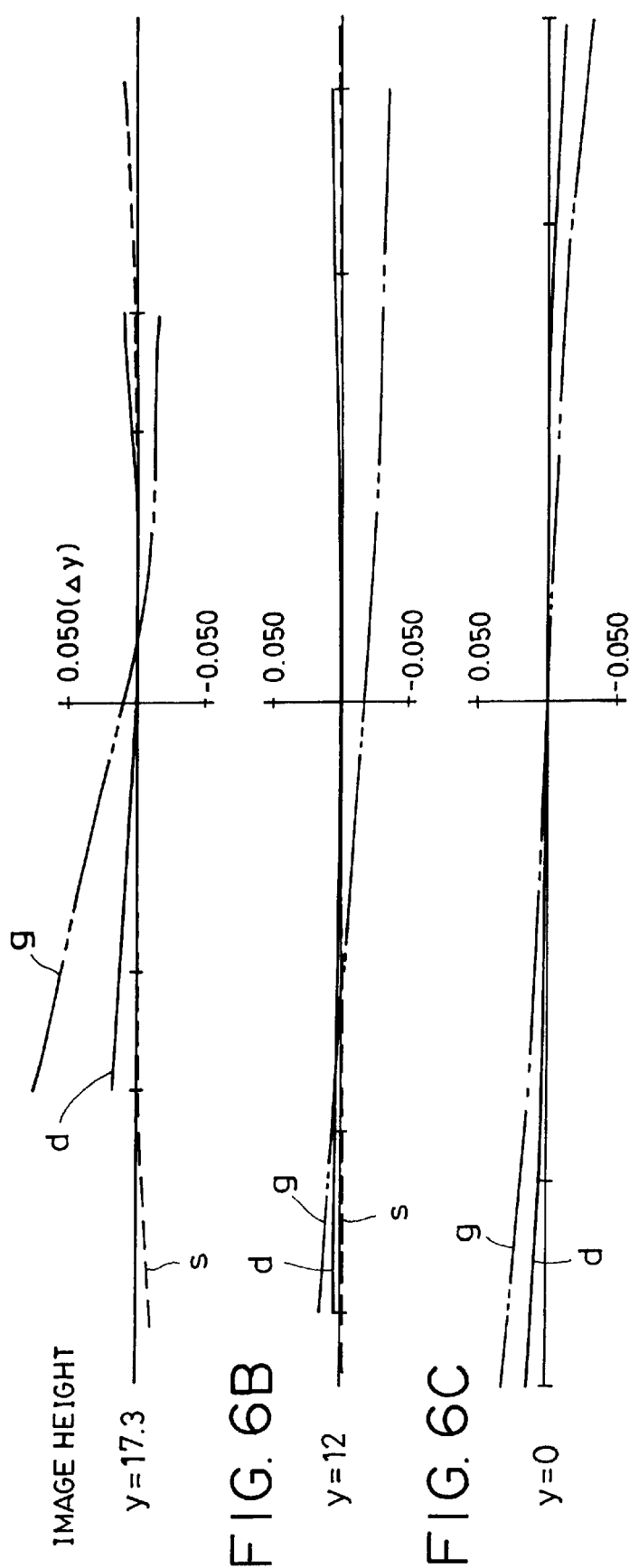

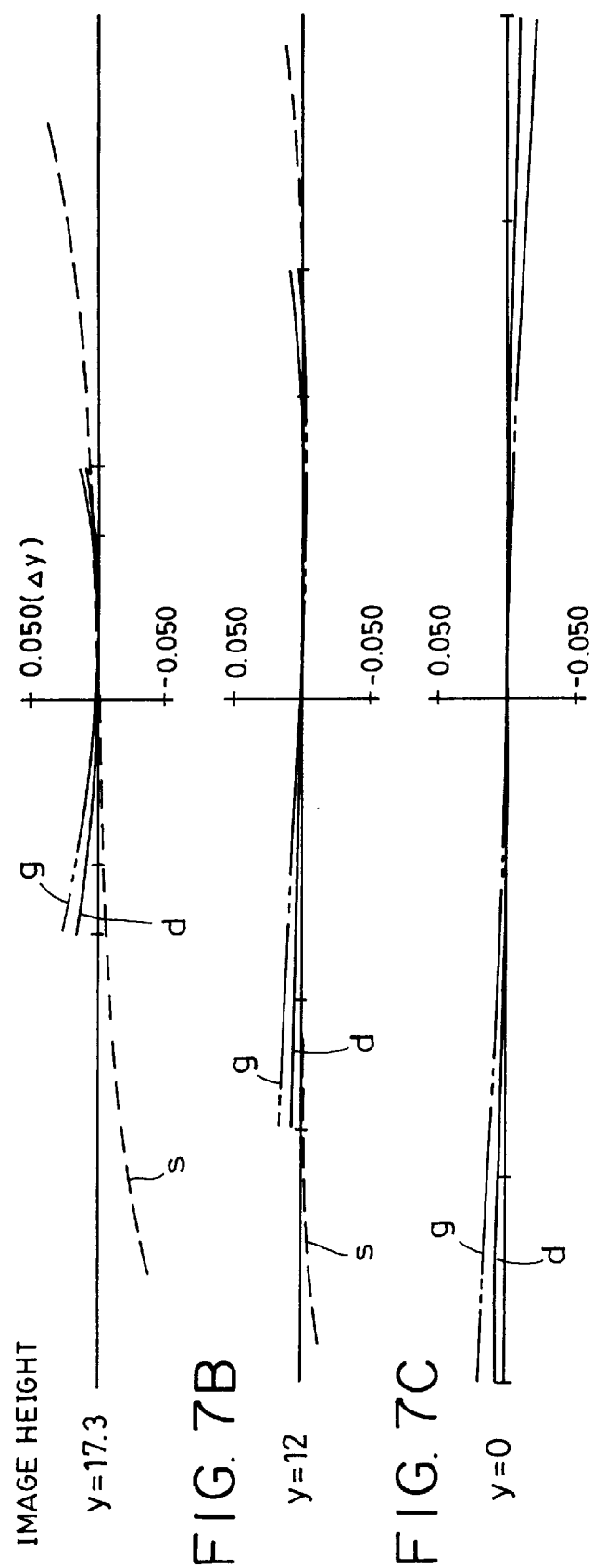

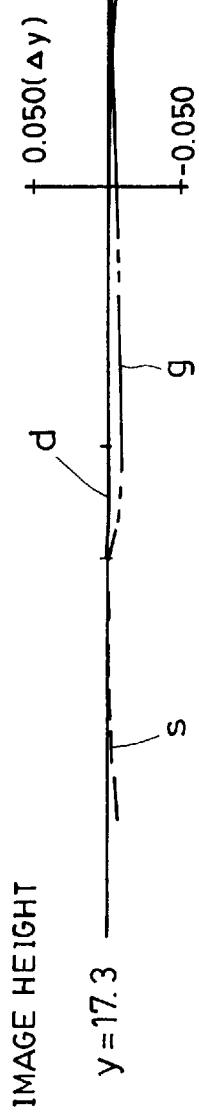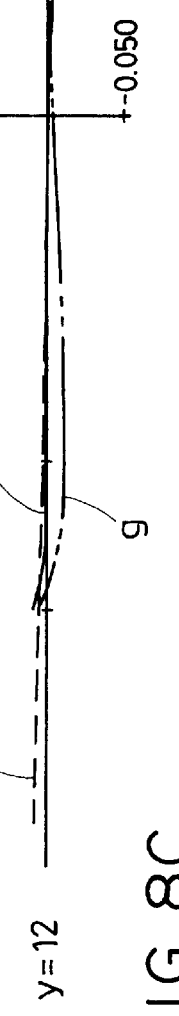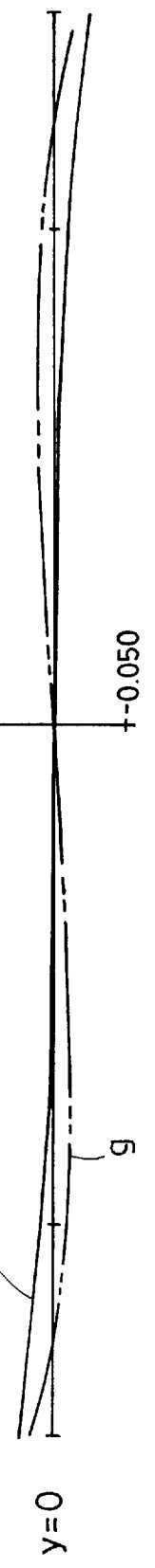

FIG. 10A  IMAGE HEIGET  y=17.3
FIG. 10B  y=12
FIG. 10C  y=0  FNo 5.7

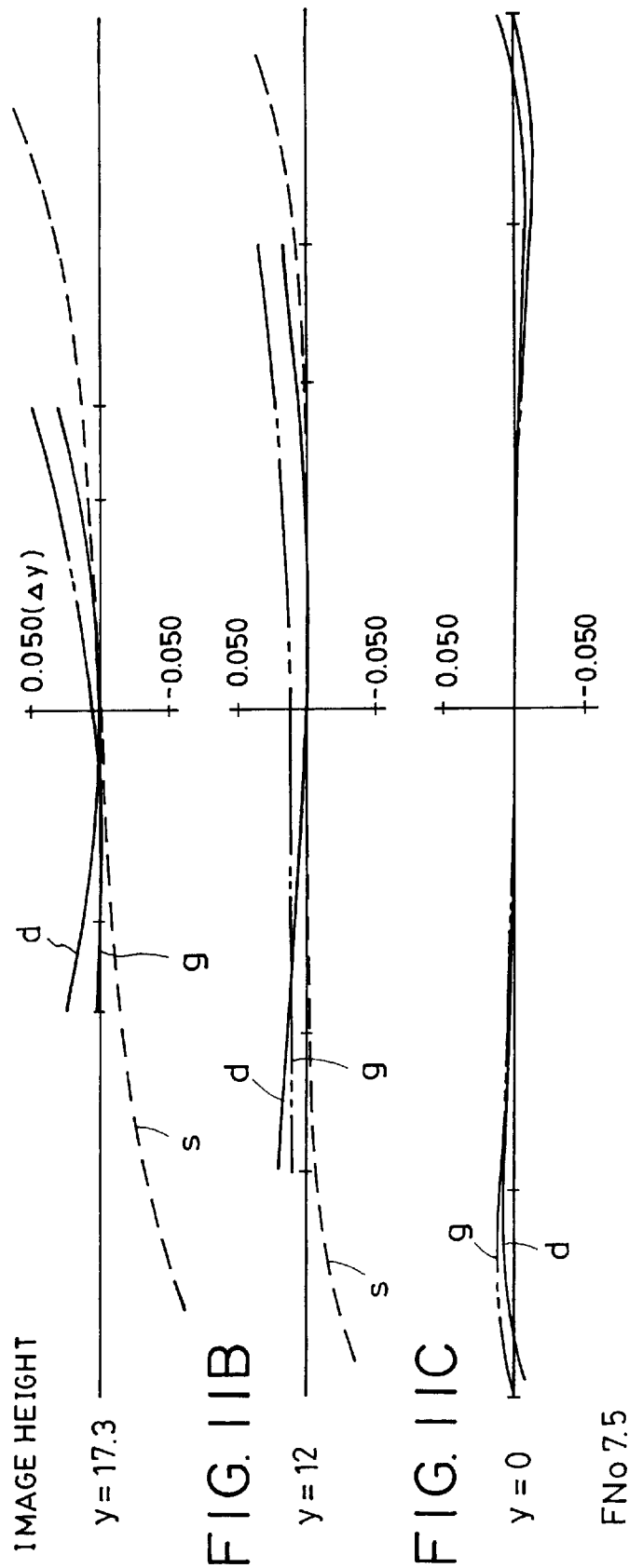

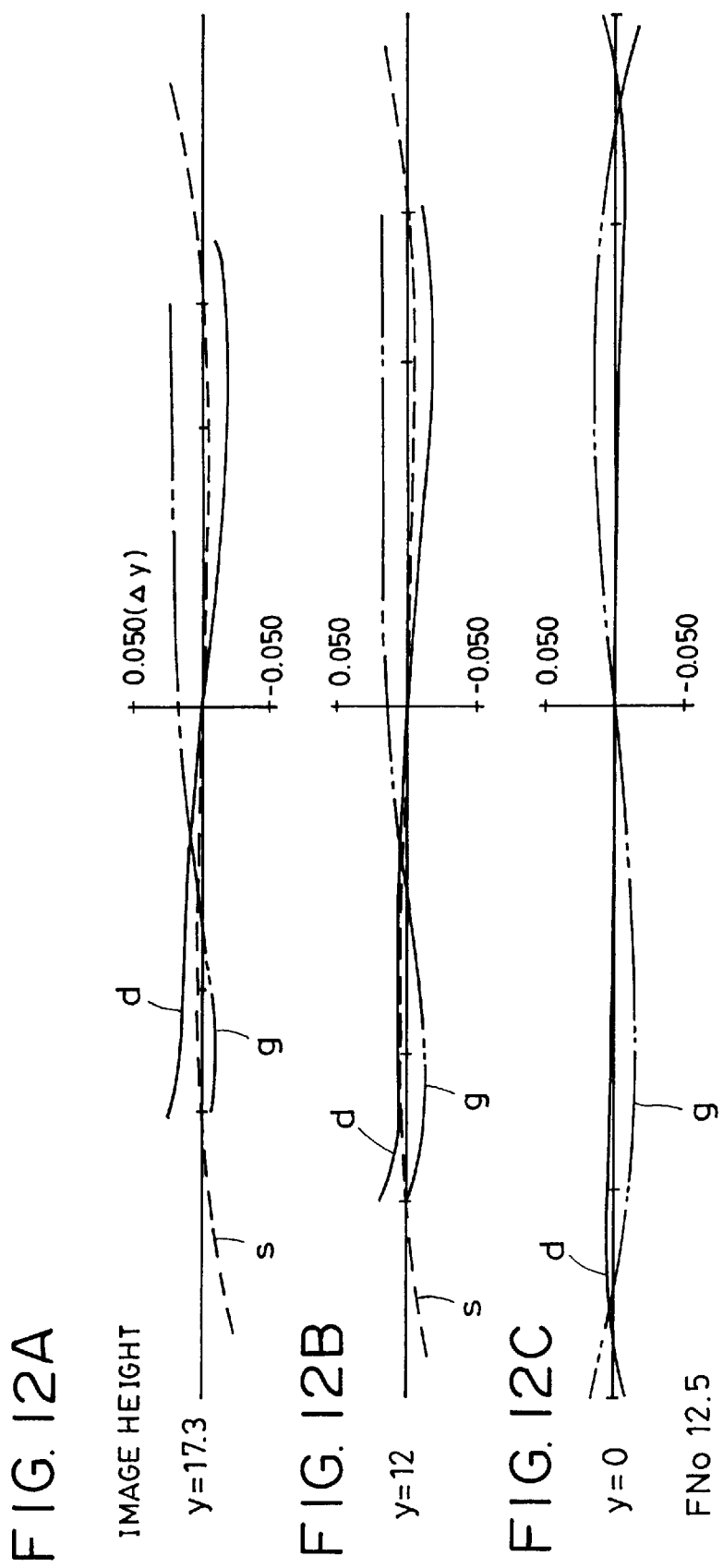

ZOOM LENS AND OPTICAL APPARATUS INCORPORATING THE SAME

BACKGROUND OF THE INVENTION

1. Field of the Invention

The present invention relates to a zoom lens and an optical apparatus incorporating the zoom lens, and, more particularly, to a zoom lens and an optical apparatus appropriate for use in lens-shutter cameras, video cameras, and digital still cameras.

2. Description of the Related Art

As lens-shutter cameras, video cameras, and digital still cameras become compact in size, the need for a compact zoom lens having a high zoom ratio and a short overall length (from a lens surface of a first lens to the image plane) is mounting.

With advances in peripheral circuits such as the electronic circuit for zoom lens driving, cameras, in particular, lens-shutter, cameras have been substantially miniaturized. Accordingly, a high zoom ratio and compact design are required of the zoom lens as a photographing lens.

Three-unit zoom lenses, each composed of three lens units of positive, positive, and negative refractive power and having a high zoom ratio have been disclosed, for example, in Japanese Patent Laid-Open No. 4-37810 (corresponding to U.S. Pat. No. 5,166,828), Japanese Patent Laid-Open No. 4-76511 (corresponding to U.S. Pat. No. 5,216,547), Japanese Patent Laid-Open No. 8-262325 (corresponding to U.S. Pat. No. 5,721,643), and Japanese Patent Laid-Open No. 9-120028 (corresponding to U.S. Pat. No. 5,793,535).

Four-unit zoom lenses, each composed of four units of negative, positive, positive, and negative refractive power and having a high zoom ratio at a relatively wide view angle, have been disclosed, for example, in Japanese Patent Laid-Open No. 4-237009, Japanese Patent Laid-Open No. 9-15499 (corresponding U.S. Pat. No. 5,587,840), and Japanese Patent Laid-Open No. 10-31155.

Generally, the increasing of the refractive power of the zoom lens reduces the amount of travel of each lens unit to result in a given zoom ratio, and shortens the overall axial length of the lens system, while still achieving a high zoom ratio.

If the refractive power of each lens unit is increased, variations in aberrations increase during zooming. Particularly with a high zoom ratio, cameras cannot provide excellent optical performance over an entire zoom range.

The above-mentioned three-unit zoom lens, composed of the three lens units of positive, positive, and negative refractive power for use in a photographing system in the lens-shutter camera, performs a zooming operation by mainly changing the air spacing between a second lens unit of positive refractive power and the third lens unit of negative refractive power, and performs a further zooming operation by narrowing the air spacing between a first lens unit of positive refractive power and the second lens unit of positive refractive power toward the telephoto end. At the same time, the curvature of image is corrected during the zooming operation.

With a high zoom ratio, chromatic aberration becomes problematic during the zooming operation. To accomplish a high image quality, a good correction state must be maintained for the chromatic aberrations generated by the lens units. To keep good the correction state for the chromatic aberrations, the amount of chromatic aberrations must be reduced. A number of lens elements must be increased to correct chromatic aberrations.

To meet the compact design and high image quality requirements with an even higher zoom ratio, some optical arrangements need to be implemented in the above mentioned four-unit zoom lens composed of four lens units of negative, positive, positive and negative refractive power.

SUMMARY OF THE INVENTION

It is an object of the present invention to provide a zoom lens and an optical apparatus incorporating the zoom lens which is composed at least four lens units, and offers excellent optical performance over a full zoom range by properly setting the manner of movements of and refractive power of the lens units.

To achieve the above object, a zoom lens of the present invention includes from the object side a first lens unit of negative refractive power, a second lens unit of positive refractive power, a third lens unit of positive refractive power, and a fourth lens unit of negative refractive power. A zooming operation is performed by axially moving the lens units so that the spacing between the first lens unit and the second lens unit becomes wider at the telephoto end than at the wide-angle end, the spacing between the second lens unit and the third lens unit becomes wider at the telephoto end than at the wide-angle end, and the spacing between the third lens unit and the fourth lens unit becomes narrower at the telephoto end than at the wide-angle end. The following conditions hold:

$$1.0 < F12w/Fw < 2.5 \quad (1)$$

$$0.6 < F3/Fw < 1.3 \quad (2)$$

$$0.4 < |F4/Fw| < 0.7 \quad (3)$$

$$0.01 < |F2/F1| < 0.16 \quad (4)$$

where Fw represents the focal length of the entire lens system at the wide-angle end, Fi represents the focal length of an i-th lens unit, and F12w represents the composite focal length of the first lens unit and the second lens unit at the wide-angle end.

Further objects, features, and advantages of the present invention will be apparent from the following description of the preferred embodiments with reference to the attached drawings.

BRIEF DESCRIPTION OF THE DRAWINGS

FIGS. 2A, 2B, and 2C are aberration charts of the numerical example 1 of the present invention at the wide-angle end;

FIGS. 4A, 4B, and 4C are aberration charts of the numerical example 1 of the present invention at the telephoto end;

FIGS. 6A, 6B, and 6C are aberration charts of the numerical example 2 of the present invention at the wide-angle end;

FIGS. 7A, 7B, and 7C are aberration charts of the numerical example 2 of the present invention at a midway point;

FIGS. 8A, 8B, and 8C are aberration charts of the numerical example 2 of the present invention at the telephoto end;

FIGS. 10A, 10B, and 10C are aberration charts of the numerical example 3 of the present invention at the wide-angle end;

FIGS. 11A, 11B, and 11C are aberration charts of the numerical example 3 of the present invention at a midway point;

FIGS. 12A, 12B, and 12C are aberration charts of the numerical example 3 of the present invention at the telephoto end.

DESCRIPTION OF THE PREFERRED EMBODIMENTS

Figure 1A:
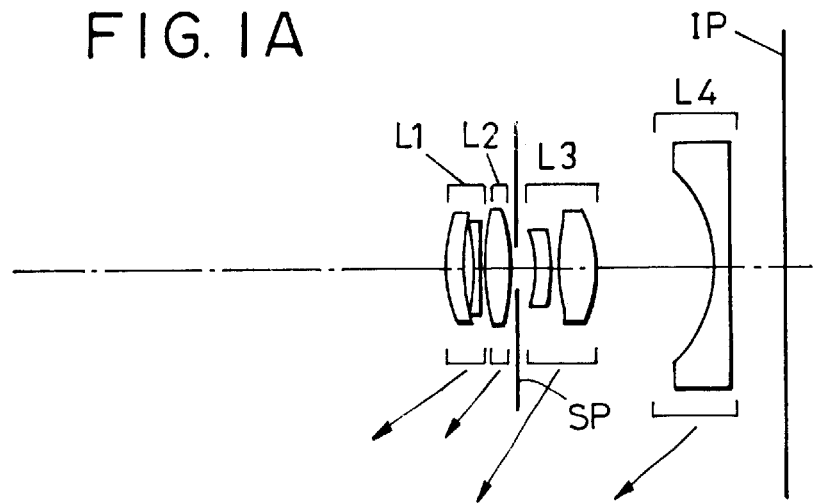
FIGS. 1A, 1B, and 1C are sectional views of a numerical example 1 of lenses in the zoom lens of the present invention.
Figure 1B:
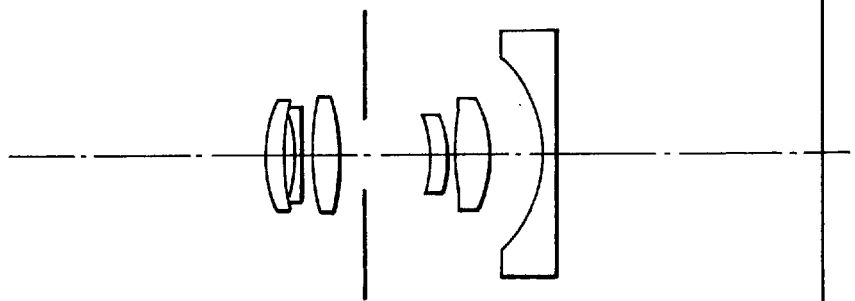
Figure 1C:
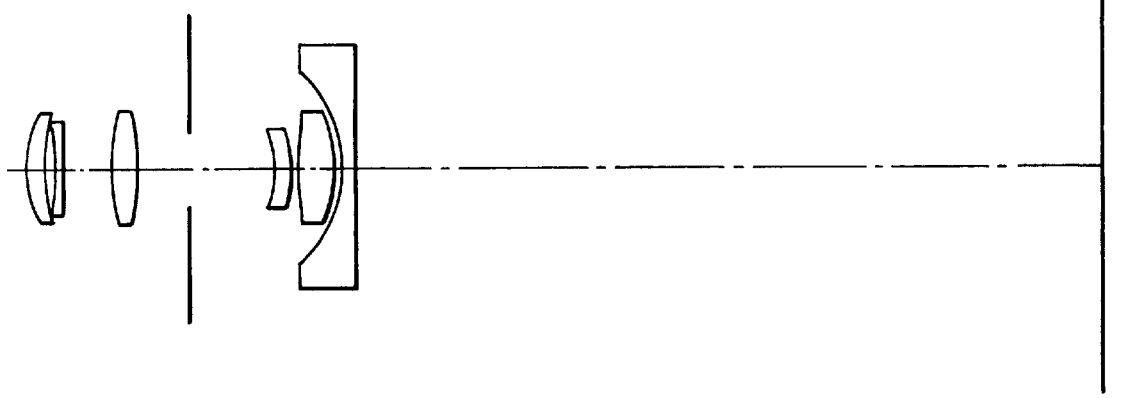
Figure 3A:
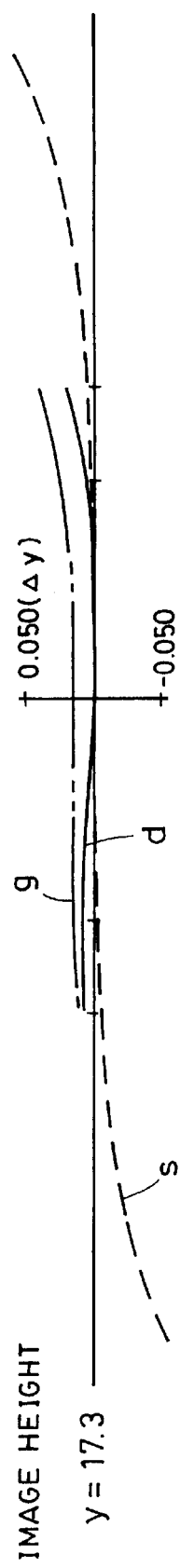
FIGS. 3A, 3B, and 3C are aberration charts of the numerical example 1 of the present invention at a midway point.
Figure 3B:
Figure 3C:
Figure 5A:
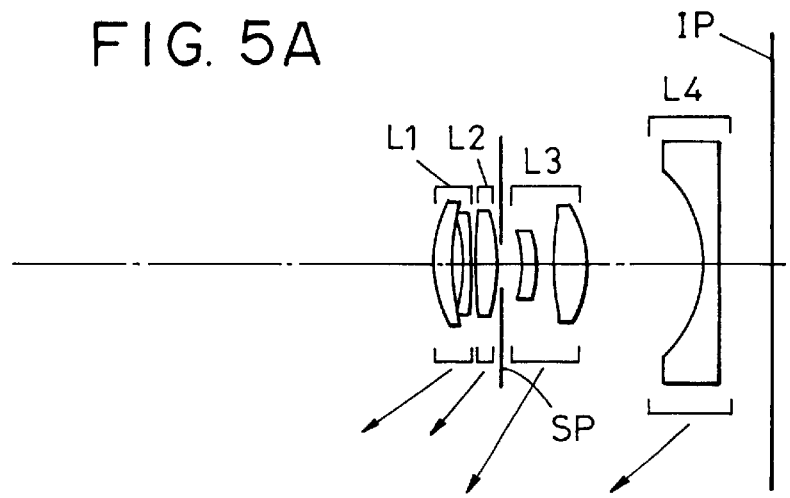
FIGS. 5A, 5B, and 5C are sectional views of a numerical example 2 of lenses in the zoom lens of the present invention.
Figure 5B:
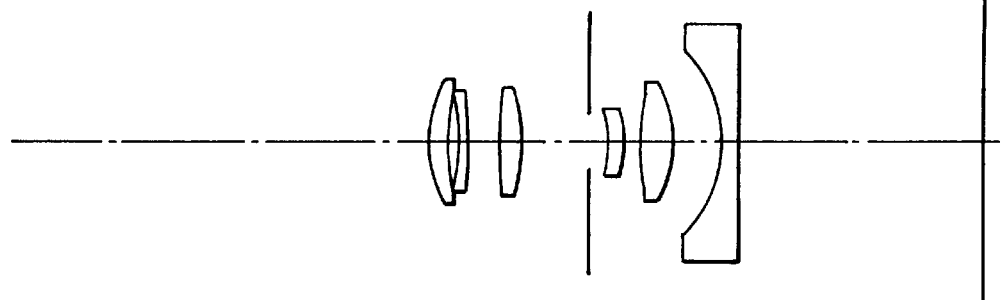
Figure 5C:
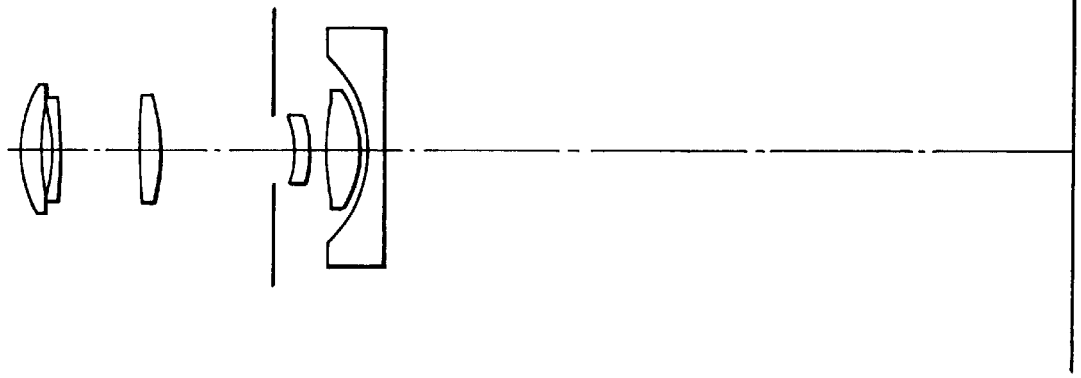
Figure 9A:
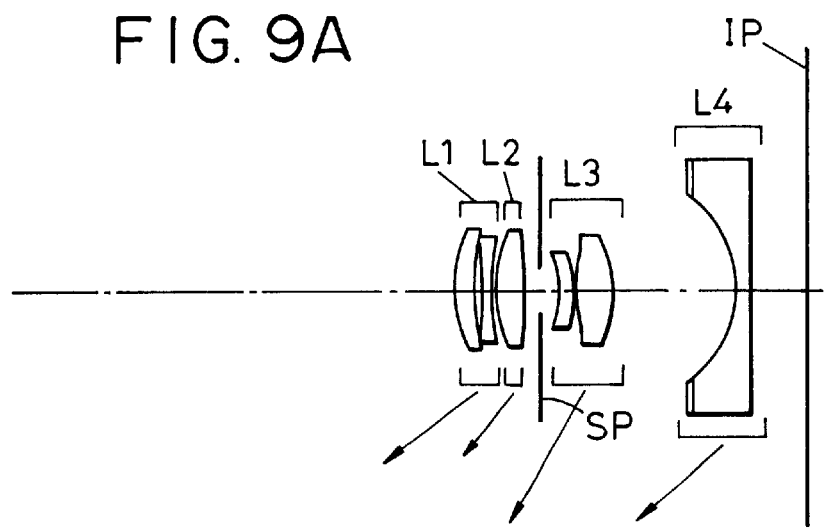
FIGS. 9A, 9B, and 9C are sectional views of a numerical example 3 of lenses in the zoom lens of the present invention.
Figure 9B:
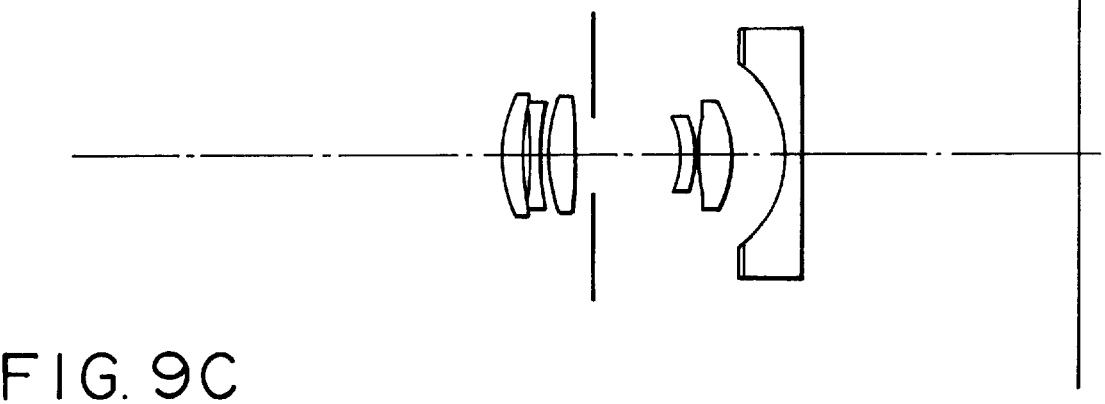
Figure 9C:
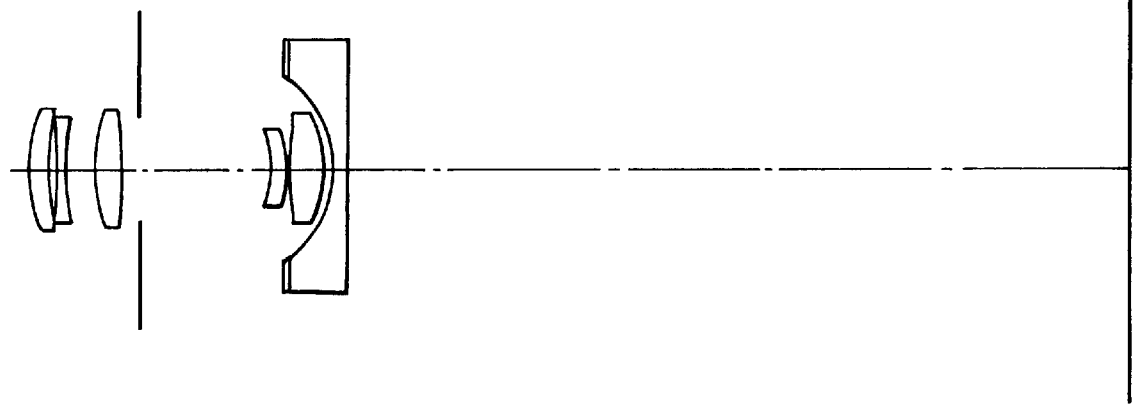

FIGS. 1A–1C, FIGS. 5A–5C, and FIGS. 9A–9C are respective sectional views of numerical examples 1, 2, and 3 of the present invention. FIG. 1A, FIG. 5A, and FIG. 9A show lens units positioned at the wide-angle end, FIG. 1B, FIG. 5B, and FIG. 9B show the lens units positioned at a midway point, and FIG. 1C, FIG. 5C, and FIG. 9C show the lens units positioned at the telephoto end.

FIGS. 2A–2C, FIGS. 3A–3C, and FIGS. 4A–4C are respective aberration charts of the numerical example 1 of the zoom lens of the present invention at the wide-angle end, the midway point, and the telephoto end. FIGS. 6A–6C, FIGS. 7A–7C, and FIGS. 8A–8C are respective aberration charts of the numerical example 2 of the zoom lens of the present invention at the wide-angle end, the midway point, and the telephoto end. FIGS. 10A–10C, FIGS. 11A–11C, and FIGS. 12A–12C are respective aberration charts of the numerical example 3 of the zoom lens of the present invention at the wide-angle end, the midway point, and the telephoto end.

As shown, L1 represents a first lens unit of negative refractive power, L2 represents a second lens unit of positive refractive power, L3 represents a third lens unit of positive refractive power, and L4 represents a fourth lens unit of negative refractive power.

Arrows represent the direction of movements of the respective lens units from the wide-angle end to the telephoto end. SP represents a diaphragm aperture, and IP represents an image plane.

A zooming operation is performed from the wide-angle end to the telephoto end by axially moving the lens units toward the object side so that the spacing between the first lens unit and the second lens unit widens, the spacing between the second lens unit and the third lens unit widens, and the spacing between the third lens unit and the fourth lens unit narrows. As a result, the spacing between the first lens unit and the second lens unit is wider at the telephoto end than at the wide-angle end, the spacing between the second lens unit and the third lens unit is wider at the telephoto end than at the wide-angle end, and the spacing between the third lens unit and the fourth lens unit is narrower at the telephoto end than at the wide-angle end. In this way, the entire lens system is miniaturized while achieving a predetermined zoom ratio with a wider view angle.

In the three-unit zoom lens, the first lens unit of positive refractive power, of the three lens units of positive, positive, and negative refractive power, is separated into a lens unit of negative refractive power and a lens unit of positive refractive power. A four-unit zoom lens thus results. During a zooming operation, the air spacing between the first lens unit and the second lens unit is varied to create a correction effect to correct variations in chromatic aberrations. By satisfying the previously described conditions (1) through (4), the present invention provides an optical system that provides an excellent image quality with a small number of lens elements.

Discussed next is what is technically meant by the above conditions (1) through (4).

The condition (1) defines the range of the composite positive refractive power of the first lens unit and the second lens unit at the wide-angle end. In excess of the upper limit, the composite refractive power become too strong at the wide-angle end, and the telephoto effect of the entire lens system is pronounced, and the back focus becomes too short, resulting in a large negative spherical aberration. Correcting such a large negative spherical aberration is difficult.

When the composite refractive power drops below the lower limit on the other hand, the overall length of the lens system increases. To maintain the focal length at the wide-angle end, the positive refractive power of the third lens unit needs strengthening. It becomes difficult to correct a variety of aberrations in a balanced manner over a full zoom range.

The condition (2) defines the range of the positive refractive power of the third lens unit at the wide-angle end.

In excess of the upper limit, the positive refractive power of the third lens unit becomes so weak that it cannot compensate for the spherical aberration. At the same time, to keep constant the focal length at the wide-angle end, the overall length of the lens system must be increased. When the positive refractive power drops below the lower limit, a large negative spherical aberration occurs. Correcting such a large negative spherical aberration with other lens units is difficult.

The condition (3) relates to the negative refractive power of the fourth lens unit at the wide-angle end.

In excess of the upper limit, the negative refractive power of the fourth lens unit weakens. The zooming effect by the fourth lens unit during a zooming operation becomes weak. To gain a predetermined zoom ratio, each lens unit must travel a longer distance. As a result, the overall length of the lens system would have to be increased.

When the refractive power drops below the lower limit, the telephoto effect of the entire lens system is pronounced, and the back focus becomes too short. To assure a certain amount of peripheral light, the lens diameter of the fourth lens unit must be enlarged. At the same time, the curvature of image and astigmatism would disadvantageously occur.

The condition (4) relates to the ratio of the refractive power of the first lens unit to the refractive power of the second lens unit. The condition (4) defines the refractive ratio that allows a small change in the air spacing between the first lens unit and the second lens unit to effectively correct chromatic aberrations.

In excess of the upper limit of the condition (4), the ratio of the positive refractive power of the second lens unit to the negative refractive power of the first lens unit becomes smaller. The air spacing between the first lens unit and the second lens unit needs to be changed to vary the chromatic aberrations. This would require a longer overall length of the lens system.

When the refractive ratio drops below the lower limit, the positive refractive power becomes too strong with respect to the negative refractive power of the first lens unit. As a result, high order spherical aberrations take place, which are difficult to correct.

The zoom lens of the present invention satisfies the above conditions. At least one of the following conditions is preferably satisfied to maintain excellent optical performance at a high zoom ratio.

(a-1) The following condition must be satisfied.

$$0.01 < \{Fw \cdot (L12t - L12w)\}/\{Ft \cdot (L23t - L23w)\} < 0.25 \quad (5)$$

where L12w represents the spacing between the first lens unit and the second lens unit at the wide-angle end, L23w represents the spacing between the second lens unit and the third lens unit at the wide-angle end, L12t represents the spacing between the first lens unit and the second lend unit at the telephoto end, L23t represents the spacing between the second lens unit and the third lens unit at the telephoto end, and Ft represents the focal length of the entire lens system at the telephoto end.

The condition (5) defines changes in the air spacings between the first lens unit and the second lens unit, and between the second lens unit and third lens unit during a zooming operation.

In excess of the upper limit, a change in the spacing between the first lens unit and the second lens unit becomes too large. To keep constant a focal length range during a zooming operation, the overall length of the lens system must be lengthened and the lens diameter of the first lens unit must be enlarged.

When the change drops below the lower limit, a change in the spacing between the first lens unit and the second lens unit becomes too small relative to a change in the spacing between the second lens unit and the third lens unit, and it becomes difficult to correct variations in the chromatic aberrations generated during zooming.

(a-2) The first lens unit includes a positive meniscus lens being convex to the object side and, at the image side thereof, a negative lens being concave to the object side.

With this arrangement, the spherical aberration and field curvature are efficiently corrected.

(a-3) The second lens unit consists of a single positive lens with both surfaces being convex.

This arrangement helps miniaturize the entire lens system.

(a-4) The third lens unit includes a negative meniscus lens being concave to the object side and a positive lens being convex to the image side, and let va represent the average of the Abbe numbers of lens materials of the third lens unit, and the condition holds.

$$54 < va \quad (6)$$

This arrangement helps correct more effectively the chromatic aberrations.

(a-5) The third lens unit include a negative meniscus lens being concave to the object side and a positive lens being convex to the image side, and the convex surface of the positive lens is aspheric.

(a-6) The third lens unit consists of a negative meniscus lens being convex to the image side and a positive lens with both surface being convex.

(a-7) The fourth lens unit consists of a negative lens being concave to the object side. This arrangement helps miniaturize the entire optical system.

(a-8) The fourth lens unit consists of a negative lens being concave to the object side, and the concave surface of the negative lens is aspheric.

In this embodiment, the negative lens of the fourth lens unit has a composite aspheric surface (a replica aspheric surface). To reduce the manufacturing cost of the aspheric lens and heighten the manufacturing yield of the zoom lens, a lens of a relatively small refractive power may be additionally arranged in the vicinity of the negative lens of the fourth lens unit on the object side thereof. That lens has an aspheric surface, instead of the negative lens.

The negative lens having the aspheric surface may be manufactured through glass molding if such a manufacturing process is available.

A further cost reduction may be possible if the additional lens is fabricated of a plastic material.

To further improve optical performance, another aspheric surface may be incorporated in any appropriate surface of a lens in the lens system, an optical grating element may be included, or a refraction distribution type optical material may be introduced.

An image stabilization effect may be provided by decentering entirely or in part a lens unit. Such effect compensates for movements of the zoom lens due to hand shaking, for example.

As discussed above, the zoom lens having the lens units of negative, positive, positive, and negative power from the object side, achieves an optimum optical arrangement with a zoom ratio as high as about 4.5 times. A compact zoom lens providing excellent optical performance thus results.

Figure 13:
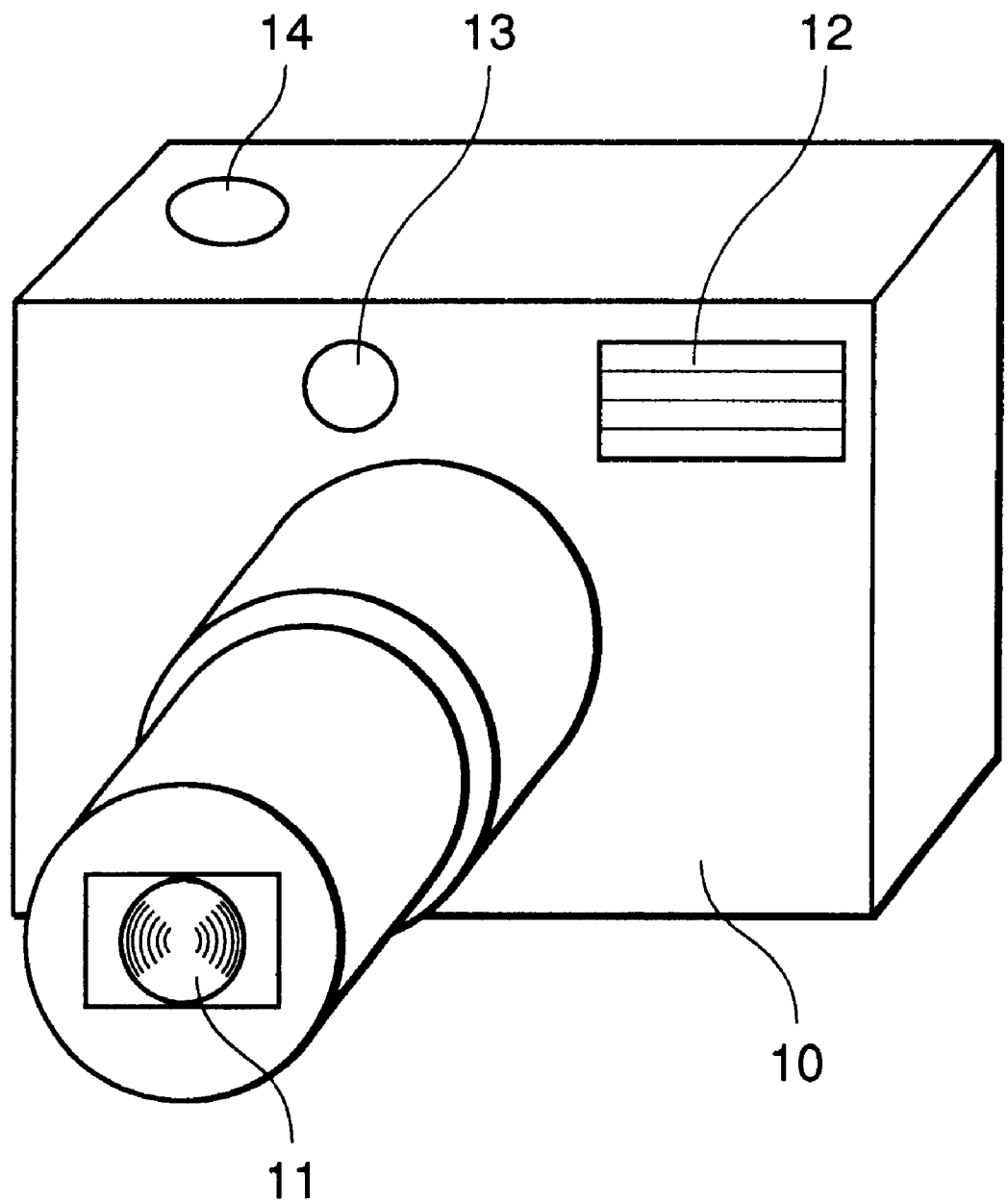
FIG. 13 is an external view of an optical apparatus of the present invention.

A compact lens-shutter camera incorporating the zoom lens of the present invention as a photographing optical system is discussed, referring to FIG. 13.

Referring to FIG. 13, there are shown a compact camera body 10, a photographing optical system 11 composed of the zoom lens of the present invention, a flash device 12 housed in the camera body, an external view finder 13, and a shutter switch 14.

With the zoom lens of the present invention incorporated in an optical apparatus such as a lens-shutter camera, a compact and high performance optical apparatus results.

Numerical examples of the present invention are now listed. In each numerical example, Ri represents the radius of curvature of an i-th surface from the object end, Di represents the thickness and spacing of an i-th optical member, and Ni and vi respectively represent the index of refraction and the Abbe number of the i-th glass optical member from the object end.

Let R represent the radius of curvature at the center of a lens, let x axis represent the optical path (in the travel direction of light), the let Y axis represent a direction perpendicular to the optical axis, and B, C, D, and E represent aspheric coefficients, and the following equation 3 holds.

$$X = \frac{(1/R)Y^2}{1 + \sqrt{1 - (1+K)(Y/R)^2}} + BY^4 + CY^6 + DY^8 + EY^{10} \quad \text{Equation 3}$$

where the notation "e-Z" means $10^{-z}$.

Table 1 lists the relationship between each of the condition equations and values in each of numerical examples of the embodiment.

| Numerical example 1 | | | |
|---|---|---|---|
| f = 24.61–115.91 | Fno = 5.70–12.50 | 2ω = 70.1–16.9 | |
| R1 = 12.153 | D1 = 1.80 | N1 = 1.517417 | ν1 = 52.4 |
| R2 = 20.182 | D2 = 0.92 | | |

-continued

Numerical example 1

| f = 24.61–115.91 | Fno = 5.70–12.50 | 2ω = 70.1–16.9 |
|---|---|---|

| | | | |
|---|---|---|---|
| R3 = −21.339 | D3 = 0.70 | N2 = 1.846660 | ν2 = 23.9 |
| R4 = 843.303 | D4 = Variable | | |
| R5 = 29.055 | D5 = 2.20 | N3 = 1.592701 | ν3 = 35.3 |
| R6 = −23.991 | D6 = Variable | | |
| R7 = Diaphragm | D7 = Variable | | |
| R8 = −8.608 | D8 = 1.30 | N4 = 1.487490 | ν4 = 70.2 |
| R9 = −14.680 | D9 = 0.85 | | |
| R10 = 33.770 | D10 = 3.2 | N5 = 1.487490 | ν5 = 70.2 |
| *R11 = −10.390 | D11 = Variable | | |
| *R12 = −9.137 | D12 = 0.05 | N6 = 1.524210 | ν6 = 51.4 |
| R13 = −12.196 | D13 = 1.50 | N7 = 1.696797 | ν7 = 55.5 |
| R14 = −438.425 | | | |

| Variable spacing | Focal length | | |
|---|---|---|---|
| | 24.61 | 53.41 | 115.91 |
| D4 | 0.50 | 1.17 | 4.60 |
| D6 | 0.67 | 2.46 | 4.95 |
| D7 | 1.8 | 6.20 | 7.97 |
| D11 | 11.12 | 4.94 | 0.68 |

Aspheric coefficients

Eleventh surface:

K = −1.70015e − 01    B = 1.71792e − 04
C = 1.41692e − 06    D = −2.57341e − 08    E = 4.58596e − 10

Twelfth surface:

K = −1.76958e + 00    B = −4.78996e − 06
C = 1.77733e − 06    D = −3.73138e − 08    E = 2.01449e − 10

Numerical example 2

| f = 23.95–112.71 | Fno = 5.70–12.50 | 2ω = 71.5–17.4 |
|---|---|---|

| | | | |
|---|---|---|---|
| R1 = 12.480 | D1 = 1.80 | N1 = 1.487490 | ν1 = 70.2 |
| R2 = 24.528 | D2 = 1.08 | | |
| R3 = −21.260 | D3 = 0.70 | N2 = 1.846658 | ν2 = 23.9 |
| R4 = −113.490 | D4 = Variable | | |
| R5 = 99.237 | D5 = 2.00 | N3 = 1.672700 | ν3 = 32.1 |
| R6 = −21.697 | D6 = Variable | | |
| R7 = Diaphragm | D7 = 2.10 | | |
| R8 = −8.758 | D8 = 1.30 | N4 = 1.882997 | ν4 = 40.8 |
| R9 = −12.974 | D9 = 1.59 | | |
| R10 = 34.041 | D10 = 3.20 | N5 = 1.487490 | ν5 = 70.2 |
| *R11 = −9.816 | D11 = Variable | | |
| *R12 = −9.396 | D12 = 0.05 | N6 = 1.524210 | ν6 = 51.4 |
| R13 = −12.714 | D13 = 1.50 | N7 = 1.696797 | ν7 = 55.5 |
| R14 = 585.173 | | | |

| Variable spacing | Focal length | | |
|---|---|---|---|
| | 23.95 | 50.27 | 112.71 |
| D4 | 0.60 | 3.20 | 7.63 |
| D6 | 0.37 | 6.47 | 10.57 |
| D11 | 10.80 | 4.69 | 0.60 |

Aspheric coefficients

Eleventh surface:

K = −4.61771e − 01    B = 1.41088e − 04
C = 3.11783e − 07    D = 1.05934e − 08    E = −2.46354e − 10

Twelfth surface:

K = −1.84221e + 00    B = 1.71405e − 05
C = 7.84234e − 07    D = −1.51608e − 08    E = 4.86366e − 11

Numerical example 3

| f = 25.34–119.34 | Fno = 5.70–12.50 | 2ω = 68.7–16.5 |
|---|---|---|

| | | | |
|---|---|---|---|
| R1 = 12.934 | D1 = 1.80 | N1 = 1.647689 | ν1 = 33.8 |
| R2 = 24.050 | D2 = 0.85 | | |
| R3 = −34.815 | D3 = 0.70 | N2 = 1.846658 | ν2 = 23.9 |
| R4 = 26.011 | D4 = Variable | | |
| R5 = 15.916 | D5 = 2.50 | N3 = 1.592701 | ν3 = 35.3 |
| R6 = −42.138 | D6 = 1.52 | | |
| R7 = Diaphragm | D7 = Variable | | |
| R8 = −8.041 | D8 = 1.30 | N4 = 1.487490 | ν4 = 70.2 |
| R9 = −13.157 | D9 = 0.17 | | |
| R10 = 27.295 | D10 = 3.20 | N5 = 1.487490 | ν5 = 70.2 |
| *R11 = −10.666 | D11 = Variable | | |
| *R12 = −8.185 | D12 = 0.05 | N6 = 1.524210 | ν6 = 51.4 |
| R13 = −10.598 | D13 = 1.50 | N7 = 1.589130 | ν7 = 61.2 |
| R14 = −296.950 | | | |

| Variable spacing | Focal length | | |
|---|---|---|---|
| | 23.34 | 54.99 | 119.34 |
| D4 | 0.50 | 0.83 | 2.68 |
| D6 | 1.80 | 8.03 | 12.09 |
| D11 | 11.09 | 4.96 | 0.80 |

Aspheric coefficients

Eleventh surface:

K = −1.41859e − 01    B = 1.46597e − 04
C = 3.84503e − 06    D = −1.38242e − 07    E = 2.05712e − 9

Twelfth surface:

K = −1.57360e + 00    B = −4.60906e − 05
C = 1.96950e − 06    D = −4.80765e − 08    E = 2.55076e − 10

TABLE 1

| Conditions | Numerical Example 1 | Numerical Example 2 | Numerical Example 3 |
|---|---|---|---|
| (1) F12w/Fw | 1.76 | 1.62 | 1.97 |
| (2) F3/Fw | 0.92 | 0.90 | 0.86 |
| (3) \|F4/Fw\| | 0.58 | 0.59 | 0.58 |
| (4) \|F2/Fw\| | 0.44 | 0.27 | 0.55 |
| (5) {Fw · (L12t−L12w)}/ {Ft · (L23t−L23w)} | 0.08 | 0.12 | 0.05 |
| (6) νa | 70.2 | 55.5 | 70.2 |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising from the object side:

a first lens unit of negative refractive power;

a second lens unit of positive refractive power;

a third lens unit of positive refractive power; and a fourth lens unit of negative refractive power, wherein a zooming operation is performed by axially moving the lens units so that the spacing between the first lens unit and the second lens unit becomes wider at the telephoto end than at the wide-angle end, the spacing between the second lens unit and the third lens unit becomes wider at the telephoto end than at the wide-angle end, the spacing between the third lens unit and the fourth lens unit becomes narrower at the telephoto end than at the wide-angle end, and wherein the following conditions hold:

$$1.0 < F12w/Fw < 2.5$$

$$0.6 < F3/Fw < 1.3$$

$$0.4 < |F4/Fw| < 0.7$$

$$0.01 < |F2/F1| < 0.16$$

where Fw represents the focal length of the entire lens system at the wide-angle end, Fi represents the focal length of an i-th lens unit, and F12w represents the composite focal length of the first lens unit and the second lens unit at the wide-angle end.

2. A zoom lens according to claim 1, wherein the following condition of $$0.01 < \{Fw \cdot (L12t - L12w)\}/\{Ft \cdot (L23t - L23w)\} < 0.25$$

holds, where L12w represents the spacing between the first lens unit and the second lens unit at the wide-angle end, L23w represents the spacing between the second lens unit and the third lens unit at the wide-angle end, L12t represents the spacing between the first lens unit and the second lens unit at the telephoto end, L23t represents the spacing between the second lens unit and the third lens unit at the telephoto end, and Ft represents the focal length of the entire lens system at the telephoto end.

3. A zoom lens according to claim 1, wherein the first lens unit comprises a positive meniscus lens being convex to the object side and a negative lens being concave to the object side.

4. A zoom lens according to claim 1, wherein the second lens unit consists of a positive lens with both lens surfaces being convex.

5. A zoom lens according to claim 1, wherein the third lens unit comprises a negative meniscus lens being concave to the object side and a positive lens being convex to the image side, and wherein the condition of 54<va holds, where va represents the average of the Abbe numbers of lens materials of the third lens unit.

6. A zoom lens according to claim 1, wherein the third lens unit comprises a negative meniscus lens being concave to the object side and a positive lens being convex to the image side, the convex surface of the positive lens being aspheric.

7. A zoom lens according to claim 1, wherein the third lens unit consists of a negative meniscus lens being convex to the image side and a positive lens with both surface being convex.

8. A zoom lens according to claim 1, wherein the fourth lens unit consists of a negative lens being concave to the object side.

9. A zoom lens according to claim 1, wherein the fourth lens unit consists of a negative lens being concave to the object side, the concave surface of the negative lens being aspheric.

10. An optical device comprising a zoom lens, the zoom lens comprising from the object side:

a first lens unit of negative refractive power;

a second lens unit of positive refractive power;

a third lens unit of positive refractive power; and a fourth lens unit of negative refractive power, wherein a zooming operation is performed by axially moving the lens units so that the spacing between the first lens unit and the second lens unit becomes wider at the telephoto end than at the wide-angle end, the spacing between the second lens unit and the third lens unit becomes wider at the telephoto end than at the wide-angle end, the spacing between the third lens unit and the fourth lens unit becomes narrower at the telephoto end than at the wide-angle end, and wherein the following conditions hold:

$$1.0 < F12w/Fw < 2.5$$

$$0.6 < F3/Fw < 1.3$$

$$0.4 < |F4/Fw| < 0.7$$

$$0.01 < |F2/F1| < 0.16$$

where Fw represents the focal length of the entire lens system at the wide-angle end, Fi represents the focal length of an i-th lens unit, and F12w represents the composite focal length of the first lens unit and the second lens unit at the wide-angle end.

* * * * *

UNITED STATES PATENT AND TRADEMARK OFFICE
CERTIFICATE OF CORRECTION

PATENT NO. : 6,429,978 B2
DATED : August 6, 2002
INVENTOR(S) : Akihiro Nishio

It is certified that error appears in the above-identified patent and that said Letters Patent is hereby corrected as shown below:

<u>Title page,</u>
Item [57], ABSTRACT,
Line 17, "unit" should read -- units --.

<u>Drawings,</u>
Sheet 10, Fig. 10A, "HEIGET" should read -- HEIGHT --.

<u>Column 1,</u>
Line 19, "shutter," should read -- shutter --.

<u>Column 2,</u>
Line 10, "composed" should read -- composed of --.

<u>Column 4,</u>
Line 16, "become" should read -- becomes --.

<u>Column 5,</u>
Line 15, "lend" should read -- lens --.
Line 53, "include" should read -- includes --.
Line 59, "surface" should read -- surfaces --.

<u>Column 10,</u>
Line 17, "surface" should read -- surfaces --.

Signed and Sealed this

Eleventh Day of February, 2003

JAMES E. ROGAN
*Director of the United States Patent and Trademark Office*